United States Patent [19]

Mery et al.

[11] Patent Number: 5,590,747
[45] Date of Patent: Jan. 7, 1997

[54] FORCE TRANSMISSION DEVICE SLIDEABLY MOUNTED TO DRUM BRAKE SHOE

[76] Inventors: Jean Claude Mery, 61, rue E. Zola, Pavillons sous Bois, France, 93320; Pierre Pressaco, 45, Rue E. Zola, La Courneuve, France, 93120

[21] Appl. No.: 133,094
[22] PCT Filed: Oct. 5, 1993
[86] PCT No.: PCT/FR93/00977
  § 371 Date: Oct. 12, 1993
  § 102(e) Date: Oct. 12, 1993
[87] PCT Pub. No.: WO94/10472
  PCT Pub. Date: May 11, 1994

[30] Foreign Application Priority Data

Oct. 30, 1992 [FR] France ................... 92 13048

[51] Int. Cl.$^6$ ................................................ F16D 65/22
[52] U.S. Cl. ................................. 188/326; 188/332
[58] Field of Search ............................ 188/326, 331, 188/332, 333, 342, 79.51, 79.54, 363, 364, 206 A, 106 F, 106 P, 329, 330

[56] References Cited

U.S. PATENT DOCUMENTS

| | | | |
|---|---|---|---|
| 2,077,939 | 4/1937 | Brie | 188/206 A |
| 2,161,640 | 6/1939 | Schnell | 188/364 X |
| 2,400,043 | 5/1946 | Goepfrich | 188/364 |
| 4,336,867 | 6/1982 | Woo | 188/106 F X |
| 4,678,067 | 7/1987 | Thompson | 188/342 X |
| 5,275,260 | 1/1994 | Evans et al. | 188/79.64 |

FOREIGN PATENT DOCUMENTS

| | | | |
|---|---|---|---|
| 258625 | 3/1988 | European Pat. Off. | 188/329 |
| 138432 | 7/1934 | Germany | 188/330 |
| 580381 | 11/1977 | U.S.S.R. | 188/330 |
| 320709 | 10/1929 | United Kingdom | 188/332 |

Primary Examiner—Josie Ballato
Attorney, Agent, or Firm—Leo H. McCormick, Jr.

[57] ABSTRACT

A drum brake comprising a support plate with first and second shoes mounted thereon. Each shoe includes a web and a rim with a friction material being secured to the rim. A hydraulic actuation device acts on a first end of each web of the first and second shoes to move the friction material on the rims into engagement with a drum to effect a brake application. A spacer located in the vicinity of the hydraulic actuation device acts on the web of each shoe to establish the distance between the first and second shoes. Each web has a second end which engages a bearing component secured to the support plate. A mechanical actuation device has a first link connected to the web of the first shoe and a second link connected to a force transmission device. The second link is connected through a pin and slit arrangement with the web on the second shoe such that a force applied to the first link causes the second link to slide in the slits to bring the second shoe into engagement with the drum while at the same time acting on the spacer to transmit a force to move the first shoe into engagement with the drum and effect a brake application.

4 Claims, 2 Drawing Sheets

5,590,747

FORCE TRANSMISSION DEVICE SLIDEABLY MOUNTED TO DRUM BRAKE SHOE

This invention relates to mechanically actuated drum brakes, this mechanical control constituting an auxiliary means for actuating the drum brake which already possesses a main brake motor, for example hydraulic. In this case, the mechanical control may constitute a parking brake or emergency brake.

In a known fashion, drum brakes usually comprise a support plate on which there are slideably mounted two shoes. Each shoe comprising a web and a rim whose face opposite the drum receives a friction lining capable of being brought into frictional engagement against the drum by a hydraulic actuation device the actuation device acts on a first end of the webs of the shoes. A strut of variable length determines the spacing of the shoes which are located in the vicinity of the hydraulic actuation device. A second end of the web of each shoe bears on a bearing component securely fastened to the support plate. A spring urges the shoes against the strut when the brake motor is not actuated.

In general, a mechanical actuation lever has a first end articulately located on the web of one of the shoes. The actuation lever has a slot at an intermediate point close to this articulation to interact with the strut of variable length and allow the shoes to be stressed away from each other under the action of a control cable fastened to a second end of the lever.

Such an arrangement of hydraulic and mechanical actuator is known in the art by the expression "with floating shoes". This is due to the absence of anchorage of the webs of the shoes on the bearing component securely fastened to the support plate. Such brakes require the mechanical actuator to provide a very large actuation force.

Other drum brake arrangements are known in the art by the expression "twin-booster". Such a turn booster does not have a bearing component between the ends of the webs of the shoes which are then articulated to one another. Such brakes have very high efficiency but have very mediocre stability and the wear of the friction linings is very unbalanced.

Document EP-A-O419,171 makes known a drum brake combining the two abovementioned arrangements, in which the brake is of floating shoe design when operated hydraulically, and of twin-booster design when operated mechanically. However, in this drum brake the mechanical-control device varies depending on the state of the drum brake.

The object of the present invention is therefore to produce a drum brake having the advantages of the two arrangements recalled hereinabove without exhibiting the drawbacks of this known system.

This object is achieved, according to the invention, with a mechanical actuation device acting between one of the shoes and a first end of a force transmission device mounted slideably on the other shoe, a second end of the force transmission device bearing on the strut of variable length, and the mechanical actuation device is arranged in the vicinity of the bearing component between the second ends of the webs of the shoes.

Other objects, features and advantages will emerge clearly from the description which follows of an embodiment of the invention given by way of nonlimiting example, with reference to the appended drawings.

DETAILED DESCRIPTION OF THE INVENTION

Figure 1:
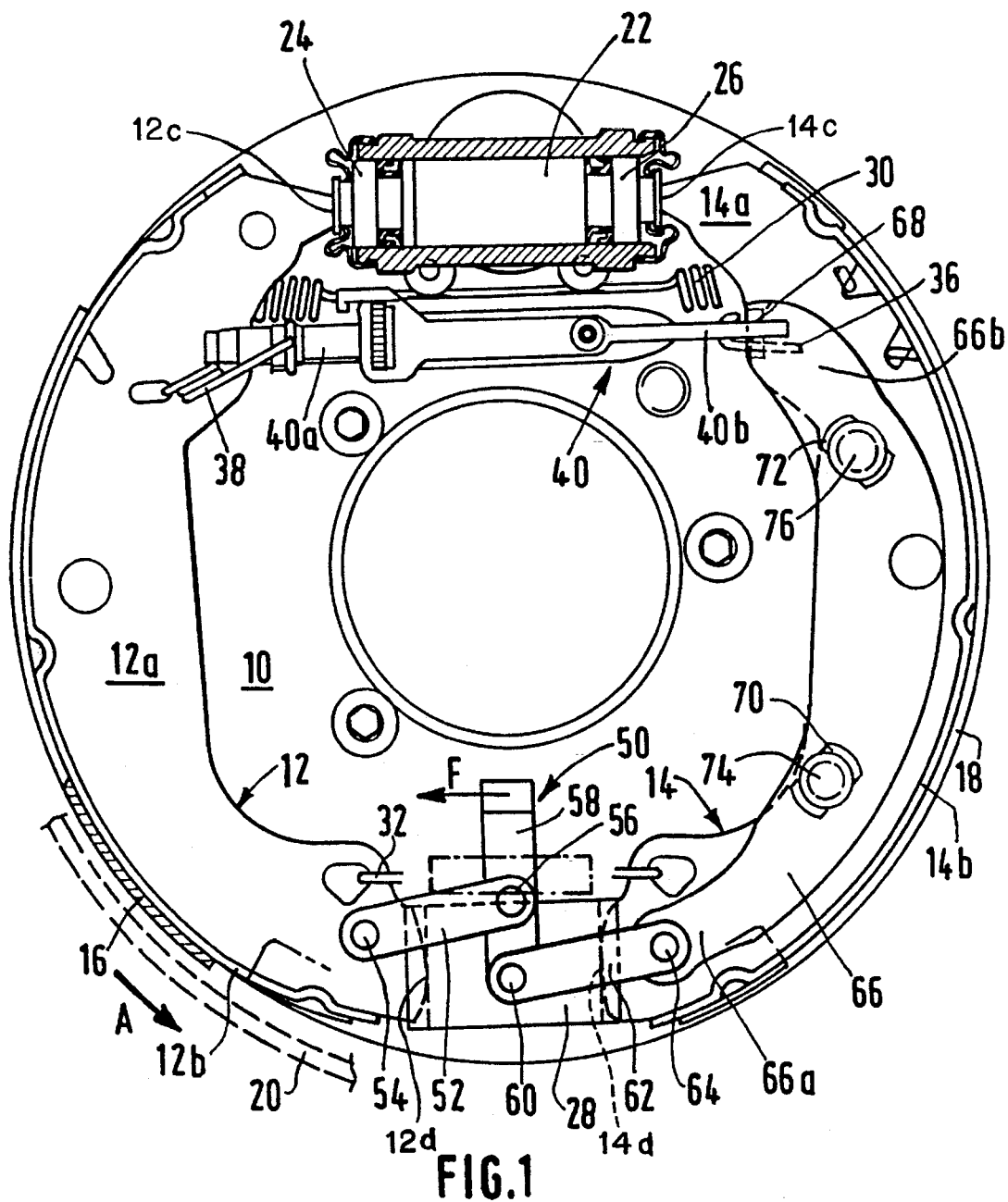
FIG. 1 represents a front view of a drum brake produced in accordance with the present invention.

The drum brake represented in FIG. 1 comprises a support plate 10 consisting of an approximately plane disk. This plate 10 is provided so as to be rigidly fastened to a fixed part of the vehicle, such as an axle flange (not shown).

Two brake shoes 12 and 14 are supported in a sliding fashion by the disk of the support plate 10, by virtue of usual mechanisms (not shown). In a well-known fashion, each of the shoes 12 and 14 comprises an approximately plane web 12a, 14a to which is fixed a perpendicular rim 12b, 14b in the shape of a circular arc supporting, on its outer face, a friction lining 16 and 18, respectively.

The shoes 12 and 14 are placed on the support plate 10 so that the outer envelopes of the linings 16 and 18 are situated on the same circle whose axis is coincident with the axis of the support plate 10. Thus, the linings 16 and 18 may come into contact with the internal surface of a brake drum 20 capping the two shoes and partially represented in dashed lines in FIG. 1. The drum 20 is concentric with the linings 16 and 18 and it is fixed to a revolving part such as a wheel of the vehicle (not shown).

A hydraulically controlled brake motor 22 is fixed to the support plate 10 between two first adjacent ends of the shoes 12 and 14. This brake motor 22 is fitted with two pistons 24 and 26 which operate in opposition so as to exert a thrust on the corresponding end of the web 12a, 14a of each of the shoes, when the brake motor is actuated.

A beating block 28, also fixed to the support plate 10, is placed between the other two adjacent ends of the shoes 12 and 14, so that the corresponding ends of the webs 12a and 14a of these shoes usually bear against this block.

A tension spring 30 is interposed between the ends 12c and 14c of the webs 12a and 14a respectively of the shoes between which the brake motor 22 is placed, in immediate proximity to the latter, in order to urge these ends close to one another when the motor is not actuated. In a comparable fashion, the other two ends 12d and 14d of the shoes 12 and 14 are held beating against the beating block 28 by means of a tension spring 32 interposed between the corresponding ends 12d and 14d of the webs of the shoes, in immediate proximity to this block.

Supposing the brake drum 12 revolves in the direction of the arrow A in FIG. 1 when the vehicle moves in a forward direction, the shoes 12 and 14 may be distinguished by the fact that the shoe 12 bears on the beating block 28 when it is in frictional contact with the drum, whilst the shoe 14 bears on the piston 26 of the brake motor 22 under the same conditions. In order to account for this difference, the shoes 12 and 14 are respectively called "leading shoe" and "trailing shoe".

The drum brake represented in FIG. 1 additionally comprises a strut 40 arranged between the shoes 12 and 14 in the vicinity of and approximately parallel to the axis of the brake motor 22.

The strut 40 has a variable length and it is equipped with automatic adjustment means allowing its length to be increased in a known fashion as the friction linings 16 and 18 wear.

For this purpose, the strut 40 comprises two end components 40a and 40b in which there are respectively formed a scallop receiving the web of the shoe 12 and a scallop receiving the web of the shoe 14.

Cutouts formed in the region of the strut 40 on the inside edge of the web of each of the shoes 12 and 14 allow the strut to be held in place.

A mechanical actuation device 50 is arranged in the region of the beating block 28 and the vicinity of the adjacent ends 12d and 14d of the shoes 12 and 14 respectively. In the example shown in FIG. 1, actuation device 50 includes first 52 and second 62 link rods. Link rod 52 is pivotably mounted at 54 on the web 12a of the shoe 12, and at 56 on an actuating lever 58. One end of actuation lever is designed to attach to a control cable (not shown).

Figure 2:
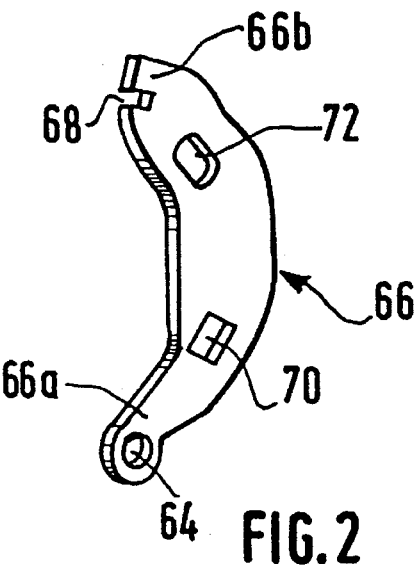
FIG. 2 represents a force transmission device used in the drum brake of FIG. 1.

Lever 58 is also pivotably mounted at 60 on the second link rod 62 which is pivotably mounted at 64 on a force transmission device 66. The device 66, as best shown in FIG. 2, is formed from a flat, generally crescent-shaped component with rounded ends 66a and 66b. End 66a is formed with the pivoting link with the link rod 62, while end 66b is formed with a scallop 68 in the bottom of which the end part 40b of the strut 40 is received.

The device 66 is mounted slideably on the shoe 14. For example, the device 66 may comprise oblong slits 70 and 72 in general, non-parallel directions, and pegs 74 and 76 may be securely fastened to the web of the shoe 14 and penetrate the slits 70 and 72.

Finally, the ends of a tension spring 36 are fastened respectively to the web of the trailing shoe 14 and on the end component 40b, so as to ensure permanent contact between the bottom of the scallop 68 formed at the end of the device 66 and the bottom of the corresponding scallop formed in the end component 40b. In a comparable fashion, the end component 40a is stressed towards the web of the shoe 12 by a tension spring 38 whose ends bear respectively on the web of the shoe 12 and on the end component 40a.

The brake which has just been described operates in the following fashion:

At rest, the various elements of the brake occupy the positions represented in FIG. 1.

When the brake is implemented hydraulically, the pressurization of the wheel cylinder 22 stresses the shoes 12 and 14 against the surfaces of the beating block 28, thus bringing the friction linings 16 and 18 into frictional contact with the drum 20. If it is necessary to take up wear in the friction linings during this implementation, the strut 40 extends automatically, its end components 40a and 40b remaining in contact with the webs 12a and 14a respectively, the spacing of the ends of the shoes 12 and 14 thus becoming greater at rest than before implementing the brake motor 22.

When the brake is implemented mechanically, the actuating lever 58 is stressed to the left looking at FIG. 1, in the direction of the arrow F, so that link rods 52 and 62 move the pivots 54 and 64 away from one another. The link rod 52 applies a force to the shoe 12 tending to move shoe 12 toward the drum 20, while link rod 62 applies a force on the device 66 tending to slide it over the shoe 14. The result of such sliding is to apply to the pegs 74 and 76 a radial force tending to urge the shoe 14 toward the drum 20, while at the same time the end 66b of the device 66 exerts a force on the end part 40b of the strut 40, which is retransmitted by the end part 40a to the web 12a of the shoe 12.

It can therefore be clearly seen that a drum brake has been produced having the advantages of a floating shoe brake when operated hydraulically and the advantages of a twin-booster brake when operated mechanically for parking or emergency braking. Indeed, high brake stability is obtained during hydraulic actuation, and high efficiency during mechanical actuation, used hypothetically for much less frequent braking actions.

Figure 3:
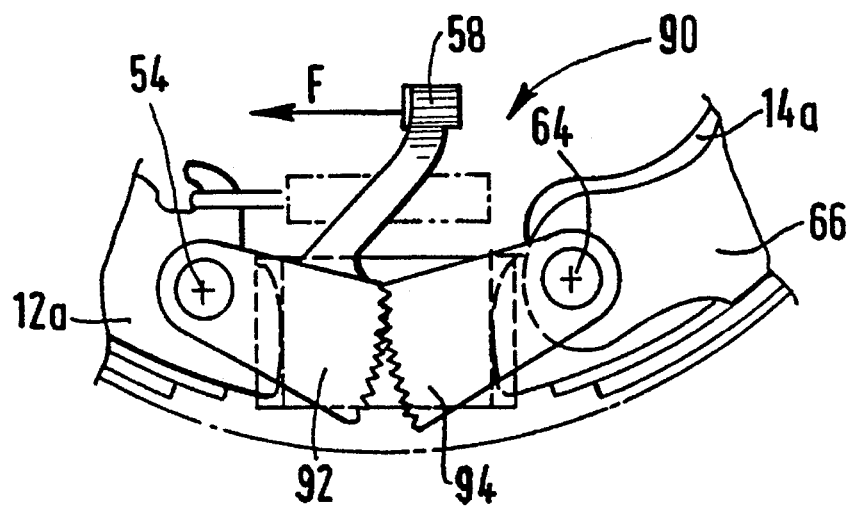
FIG. 3 represents a variant of the mechanical actuation device of FIG. 1.
Figure 4:
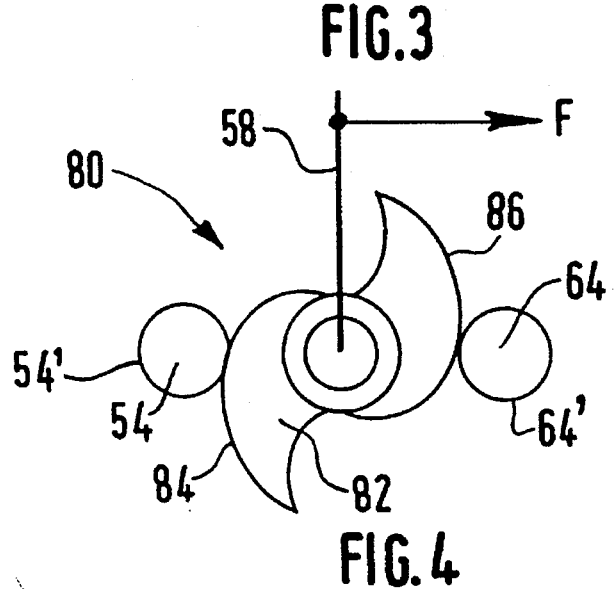
FIG. 4 represents another variant of the mechanical actuation device of FIG. 1.

FIGS. 3 and 4 represent embodiment variants of the mechanical actuation device 50 for the drum brake 10. In FIG. 3, such a device 90 comprises a first eccentric toothed sector 92 mounted pivotably at 54 on the web 12a of the shoe 12, and a second eccentric toothed sector 94 mounted pivotably at 64 on the force transmission device 66. An actuating lever 58 is securely fastened to one of the toothed sectors, for example the sector 92. It is easily understood that actuation of this lever 58 will have the effect of moving the pivots 54 and 64 away from one another, as has been described above, with an identical operation.

In FIG. 4, the mechanical actuation device 80 comprises a cam 82 securely fastened to an actuating lever shown diagrammatically at 58. The cam 82 comprises symmetrical involute surfaces 84 and 86 interacting with a first roller 54' mounted pivotably at 54 on the web 12a of the shoe 12 and with a second roller 64' mounted pivotably at 64 on the force transmission device 66. As described previously, actuation of the lever 58 will have the effect of moving the pivots 54 and 64 away from one another.

Other advantages result from the specific design of the drum brake according to the invention. Thus, when the vehicle thus equipped is stationary following a hydraulic operation, the webs of the shoes 12 and 14 are firmly stressed against the bearing block 28. The force exerted on the actuating lever will therefore not be used in order to separate the shoes 12 and 14 from the bearing block 28, but in order to bring the various elements of the brake into a configuration such that, if the hydraulic pressure in the brake motor 22 is released, the shoes 12 and 14 retain their position of frictional engagement with the drum 20.

In addition, since the mechanical actuator 50 is situated in the vicinity of the bearing component 28, whose faces serve as reference to the position at this point, of the shoes 12 and 14, whose linings 16 and 18 undergo only slight wear at this point, the actuation travel of the lever 58, and therefore of the control cable which is fastened to it, will remain substantially constant regardless of the wear of the friction linings.

We claim:

1. A drum brake comprising a support plate on which is mounted slideably first and second shoes, each of said first and second shoes comprising a web and a rim, said rim having a face for receiving a friction lining, said friction lining being capable of being brought into frictional engagement with a drum by a hydraulic actuation device to effect a brake application, said hydraulic actuation device acting on a first end of said web of the first and second shoes, a strut of variable length for establishing a desired spacing between said first and second shoes, said strut being located in a vicinity of said hydraulic actuation device, said web of said first and second shoes having a second end which bears on a bearing component fastened securely to said support plate, characterised in that said brake comprises a mechanical actuation device acting between said first and second shoes and a first end of a force transmission device mounted slideably on said second shoe, said force transmission device being mounted slideably on pins carried by said web in said second shoe and sliding in oblong slits formed therein, said force transmission device having a second end which bears on said strut of variable length, said mechanical actuation device being located between said second end of said web of said first and second shoes and in the vicinity of said bearing component.

2. The drum brake according to claim 1, characterised in that said mechanical actuation device includes first and second link rods, said first link rod being pivotably mounted on said web of said first shoe and said second link rod mounted pivotably on said force transmission device, the first and second link rods being pivotably mounted on an actuating lever.

3. The drum brake according to claim 1, characterised in that the mechanical actuation device comprises a first eccentric toothed sector mounted pivotably on said web of said first shoe and a second eccentric toothed sector mounted pivotably on said force transmission device, said first eccentric toothed sectors being fastened securely to an actuating lever.

4. The drum brake according to claim 1, characterised in that the mechanical actuation device comprises a cam securely to an actuating lever, said cam comprising symmetrical involute surfaces which interact with a first roller mounted pivotably on said web of said first shoe and with a second roller mounted pivotably on said force transmission device.

* * * * *